United States Patent Office 3,660,322
Patented May 2, 1972

3,660,322
BENZENE-RING-SUBSTITUTED TETRA-
HYDRO-QUINAZOLINES
Luigi Bernardi, Alberto Bonsignori, Severina Coda, and
Giselbert Karl Suchowsky, Milan, Italy, assignors to
Societá Farmaceutici Italia, Milan, Italy
No Drawing. Filed Nov. 21, 1969, Ser. No. 878,880
Claims priority, application Italy, Nov. 26, 1968,
24,160/68
Int. Cl. C07d 51/48
U.S. Cl. 260—251 QA                       6 Claims

ABSTRACT OF THE DISCLOSURE

Quinazolines of the formula:

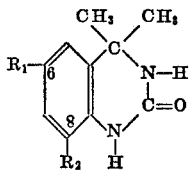

wherein $R_1$ is selected from the group consisting of chlorine, bromine or nitro, and $R_2$ is selected from the group consisting of hydrogen, chlorine, bromine or nitro. These compounds possess a central nervous system depressant activity.

---

Our invention relates to a class of biologically active quinazolines and the process for the preparation thereof. The compounds of the invention display an interesting depressive activity on the central nervous system and have the formula:

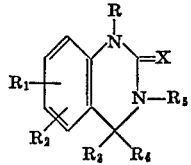

wherein R and $R_5$ are selected from the group consisting of hydrogen, lower alkyl and phenyl; $R_1$ and $R_2$ are selected from the group consisting of hydrogen, lower alkyl, lower alkoxy, halogen, $NO_2$ and $$\diagup N \diagdown \begin{matrix} R' \\ R' \end{matrix}$$

wherein R' is a lower alkyl or the two radicals R' combined together form a ring; $R_3$ and $R_4$ are a lower alkyl; and X is selected from the group consisting of O, S and NH.

The definition "lower alkyl" is used for alkyl radicals containing from 1 to 4 carbon atoms.

The above-mentioned quinazoline compounds display an interesting depressive activity on the central nervous systems. They are particularly suitable to oral administration.

These compounds can be prepared according to the invention by melting a phenylycarbinol of the formula:

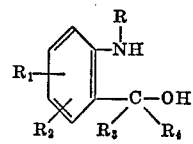

wherein R, $R_1$, $R_2$, $R_3$ and $R_4$ have the above meaning with a compound selected from the group consisting of urea, thiourea, guanidine and their equivalents such as cyanates or thiocyanates. The carbinol starting material is prepared according to J. Chem. Soc. 1947, p. 810. The resulting quinazoline compounds are purified by chromatography or crystallization from suitable solvents.

The study of their depressive activity has been effected particularly on 1,2,3,4-tetrahydro - 4,4 - dimethylquinazoline-2-one. This compound has undergone a general screening in the male albino mouse (21–22 g. weight) and it has been administered by oral route at the doses of 30, 100, 300 and 1000 mg./kg., suspended in a 5% gum arabic solution. The volume administered was 2 cc. per 100 g. of body weight. The animals were observed at 30, 90 and 300 minutes after the treatment.

A deeper study of the depressive activity on the central nervous system has been carried out to determine a possible anticonvulsant and tranquillizing effect in the mouse. For this purpose, the inhibiting dose 50 ($ID_{50}$) has been determined in the antagonism to the convulsions induced by strychnine (0.75 mg./kg. intravenously), by cardiazol (40 mg./kg. intravenously), by nicotine (3 mg./kg. intravenously) and by electroshock (60 volts during 1.0 sec.). The tranquillizing activity was studied in the struggling mouse. Its aggressiveness has been induced by electric stimulation (60 volts, 20 stimulations per second during each 5 seconds).

Meprobamate or 2-methyl-2-propyl-1,3-propandiol dicarbamate was used as the standard compound for the comparison. Meprobamate is well known as a tranquillizing and anticonvulsant compound.

The data obtained are listed in the following table:

| | $ID_{50}$, mg./kg., os | | | | | | | $LD_{50}$, mg./kg., os |
|---|---|---|---|---|---|---|---|---|
| | Strychnine | | Cardiazol, conv. | Nicotine | | ELS, conv. | Struggling mouse | |
| Compound | Conv. | Death | | Conv. | Death | | | |
| 1,2,3,4-tetrahydro-4,4-dimethylquinazolin-2-one | [1] 150 | [1] 150 | 83 | 58 | 53 | 93 | 125 | 1,450 |
| Meprobamate | 205 | 120 | 41 | 115 | 160 | 150 | 140 | 1,200 |

[1] Inact.

The following examples are to illustrate the invention without limiting it.

EXAMPLE 1

1,2,3,4-tetrahydro-4,4-dimethylquinazoline-2-one 33 grams of o.aminophenyldimethylcarbinol and 28 g. of urea were melted under slow shaking in a bath at 150° C. The fluid mass was maintained for two hours at the same temperature. The reaction production was cooled, triturated with ether and 12 g. of urea were filtered off. By evaporating the filtrate an oily residue was obtained. The residue was dissolved in benzene and chromatographed over an alumina column, followed by eluting with chloroform containing 10% ethanol. The mixture was shaken up with ether, filtered and washed deeply with ether. 19.5 g. of white crystals of 1,2,3,4-tetrahydro-4,4-dimethylquinazolin-2-one melting at 161–162° C. were obtained.

EXAMPLE 2

1,2,3,4-tetrahydro-4,4-dimethyl-6-bromo-quinazoline-2-one

The operation was as in Example 1, with the difference that the starting material was 2-amino-5-bromophenyl-dimethylcarbinol. 1,2,3,4 - tetrahydro-4,4-dimethyl-6-bromo-quinazoline-2-one was obtained as white crystals which melt at 193–196° C.

EXAMPLE 3

1,2,3,4-tetrahydro-4,4-dimethyl-6,8-dibromo-quinazoline-2-one

The operation was as in Example 1, with the difference that the starting material was 2-amino-3,5-dibromophenyl-dimethylcarbinol. 1,2,3,4 - tetrahydro-4,4-dimethyl-6,8-dibromo-quinazoline-2-one was obtained in white crystals which melt at 218–220° C.

EXAMPLE 4

1,2,3,4-tetrahydro-4,4-dimethyl-6-chloro-quinazoline-2-one

The operation was as in Example 1, with the difference that the starting product was 2-amino-5-chlorophenyl-dimethylcarbinol. 1,2,3,4 - tetrahydro-4,4-dimethyl-6-chloro-quinazoline-2-one was obtained in white crystals, which melt at 195° C.

EXAMPLE 5

1,2,3,4-tetrahydro-4,4-dimethyl-6,8-dichloro-quinazoline-2-one

The operation was as in Example 1, with the difference that the starting material was 2-amino-3,5-dichlorophenyl-dimethylcarbinol. 1,2,3,4 - tetrahydro-4,4-dimethyl-6,8-dichloroquinazoline-2-one was obtained in white crystals, which melt at 197° C.

EXAMPLE 6

1,2,3,4-tetrahydro-4,4-dimethyl-6,8-dinitro-quinazoline-2-one

The operation was as in Example 1, with the difference that the starting material was 2-amino-3,5-dinitro-phenyl-dimethylcarbinol. 1,2,3,4 - tetrahydro-4,4-dimethyl-6,8-dinitroquinazoline-2-one was obtained in small yellow needles, which melt at 274° C.

EXAMPLE 7

1,2,3,4-tetrahydro-4,4-dimethyl-6-N-piperidino-quinazoline-2-one

The operation was as in Example 1, with the difference that the starting material was 2-amino-5-N-piperidino-phenyldimethylcarbinol. 1,2,3,4 - tetrahydro-4,4-dimethyl-6-N-piperidino-quinazoline-2-one, melting at 254–255° C., was obtained.

EXAMPLE 8

1,2,3,4-tetrahydro-4,4-dimethyl-quinazoline-2-thione 19 grams of o.aminophenyl-dimethylcarbinol and 30 g. of thiourea was heated in an oil bath at 180° C. for two hours under slow shaking. The reaction product was cooled, triturated with water and the insoluble part, which consists of the crude compound, was filtered off. Crystallization from alcohol gave 12 g. of 1,2,3,4-tetrahydro-4,4-dimethyl-quinazoline-2-thione in white crystals, which melt at 216–217° C.

We claim:
1. A quinazoline of the formula:

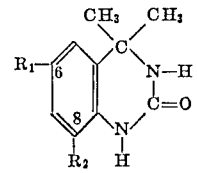

wherein $R_1$ is selected from the group consisting of chlorine, bromine or nitro, and $R_2$ is selected from the group consisting of hydrogen, chlorine, bromine or nitro.

2. The compound of claim 1, which is 1,2,3,4-tetrahydro-4,4-dimethyl-6-bromo-quinazolin-2-one.

3. The compound of claim 1, which is 1,2,3,4-tetrahydro-4,4-dimethyl-6,8-dibromo-quinazolin-2-one.

4. The compound of claim 1, which is 1,2,3,4-tetrahydro-4,4-dimethyl-6-chloro-quinazolin-2-one.

5. The compound of claim 1, which is 1,2,3,4-tetrahydro-4,4-dimethyl-6,8-dichloro-quinazolin-2-one.

6. The compound of claim 1, which is 1,2,3,4-tetrahydro-4,4-dimethyl-6,8-dinitro-quinazolin-2-one.

References Cited

UNITED STATES PATENTS

| | | | |
|---|---|---|---|
| 3,454,574 | 7/1969 | Keck et al. | 260—251 |
| 3,509,149 | 4/1970 | Cusic et al. | 260—251 |

OTHER REFERENCES

Braun et al. C.A. 8, 124[3] (1914).
Orth et al. C.A. 56, 5964f (1962).
Willems et al. C.A. 70, 42844d (1969).
Troger et al. C.A. 22, 427[9] (1928).

ALEX MAZEL, Primary Examiner

R. V. RUSH, Assistant Examiner

U.S. Cl. X.R.

260—256.4 Q, 256.5 R; 424—251